United States Patent [19]

Ohmae et al.

[11] Patent Number: 4,630,200
[45] Date of Patent: Dec. 16, 1986

[54] ELECTRONIC CASH REGISTER CAPABLE OF PERFORMING CASH-DISPENSING TRANSACTIONS

[75] Inventors: Kenichi Ohmae, Yokohama; Kazuma Tateisi, Kyoto; Yoshitsugu Shinohara, Shiga; Shinichiro Mizuno, Ibaraki, all of Japan

[73] Assignee: Omron Tateisi Electronics Co., Kyoto, Japan

[21] Appl. No.: 584,790

[22] Filed: Feb. 29, 1984

[30] Foreign Application Priority Data

Mar. 1, 1983 [JP] Japan .................. 58-34025

[51] Int. Cl.⁴ ............................. G06F 15/30
[52] U.S. Cl. .................... 364/405; 235/379; 235/380
[58] Field of Search ............... 364/400–401, 364/405, 408; 235/379–380, 382, 382.5

[56] References Cited

U.S. PATENT DOCUMENTS

| | | | |
|---|---|---|---|
| 3,996,450 | 12/1976 | Kerkhoff | 235/380 X |
| 4,189,774 | 2/1980 | Kashio | 364/405 |
| 4,249,163 | 2/1981 | Maurer et al. | 235/379 X |
| 4,322,796 | 3/1982 | Uchida et al. | 364/405 |
| 4,360,872 | 11/1982 | Suzuki et al. | 364/405 |
| 4,375,032 | 2/1983 | Uchida | 235/380 |
| 4,399,508 | 8/1983 | Nakatani et al. | 364/405 |
| 4,423,316 | 12/1983 | Sano et al. | 235/379 |
| 4,430,562 | 2/1984 | Lundblad | 235/379 |
| 4,434,359 | 2/1984 | Watanabe | 235/379 |
| 4,484,304 | 11/1984 | Anderson et al. | 235/380 X |
| 4,485,300 | 11/1984 | Peirce | 235/380 |
| 4,511,970 | 4/1985 | Ōkano et al. | 364/401 |
| 4,532,641 | 7/1985 | Nishimura | 364/405 X |

*Primary Examiner*—Gary V. Harkcom
*Attorney, Agent, or Firm*—Stevens, Davis, Miller & Mosher

[57] ABSTRACT

An electronic cash register comprises a keyboard having a cashing key for dispensing cash from a drawer and numerical keys for entering cashing sums, and keys or a card reader for entering customer identifying symbols. The register has a memory including a cashing file for storing cashing sums in corresponding relation to the customer identifying symbols. When a cashing sum is entered and the cashing key is depressed, the cashing sum entered and the corresponding customer identifying symbol are stored in the cashing file.

10 Claims, 10 Drawing Figures

ELECTRONIC CASH REGISTER CAPABLE OF PERFORMING CASH-DISPENSING TRANSACTIONS

BACKGROUND OF THE INVENTION

The present invention relates to an electronic cash register.

Cash lending service has become available at supermarkets, etc. However, this service is offered only manually or with use of a cash dispenser at a specific location and therefore involves the problem that additional personnel cost and equipment cost accrue to the store in order to provide this service. The service further has the drawback that it is necessary for the customer to go to the specific location.

SUMMARY OF THE INVENTION

An object of the present invention is to provide an electronic cash register having a cashing function to achieve savings in personnel and equipment cost that would otherwise accrue to the store and to assure convenience to the customer.

The term "cashing" as herein used means withdrawal of cash or delivery of a loan or like cash to the customer.

The electronic cash register of the present invention is characterized in that the register comprises a keyboard having a cashing key for dispensing cash from a drawer and numerical keys for entering cashing sums, input means for entering customer identifying symbols, a cashing file for storing cashing sums in corresponding relation to the customer identifying symbols, and a control unit for storing a cashing sum entered and the corresponding customer identifying symbol on the cashing file when the sum is entered and the cashing key is depressed. The keyboard and the control unit are used also for cash registration.

Preferably a card is used to verify the eligibility of the customer. The card may be one issued by the store where the electronic cash register is installed for cashing service or by an association to which the store belongs. Further the card may be a bank card issued from a bank or a credit card issued from a credit company. When required, the cash register is provided with a card reader. Preferably a control center is provided for controlling the cashing service to be performed by a multiplicity of electronic cash registers installed at various stores or locations. The center is provided with a customer file having stored thereon data relating to the customers. The center determines whether a particular cashing service is to be performed with reference to the data on the file. Each electronic cash register is connected to the center by a communication (telephone) line. Accordingly the cash register and the center have a communication function. The eligibility can be checked or the credit can be secured by some other method.

It is preferred that the drawer of the register containing cash be opened only under predetermined conditions, for example, only when the register receives a cashing permission instruction from the center. The electronic cash register is further provided with a display for showing whether a particualr cashing service can be offered, and a printer for printing cashing information. The display and the printer are used also for cash registration.

The electronic cash register inherently has a cash registering function and contains cash in its drawer. The present invention, which makes use of this function of the register and the cash accommodated therein, does not require additional provision of the cash dispenser conventionally needed and assures savings in personnel cost since the cash register operator also performs the cashing service. The invention further assures convenience to the customer because the cashing service is available where the cash register is installed at the store. Because the cash register has incorporated therein a cashing file with cashing data stored thereon, the data can be printed by the printer to give cashing information and to administer the service with ease.

DESCRIPTION OF THE PREFERRED EMBODIMENT

Figure 1:
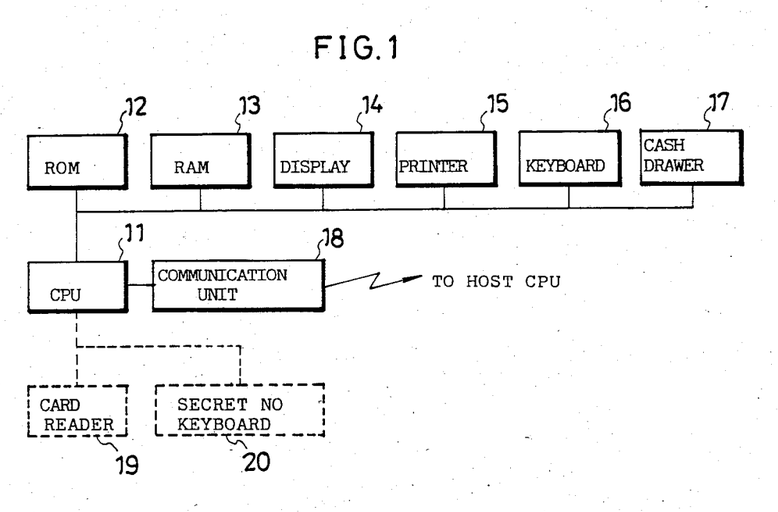
FIG. 1 is a block diagram showing the electric construction of an electronic cash register (ECR)

FIG. 1 shows the electronic construction of an electronic cash register (ECR). The ECR is controlled by a CPU 11, which is provided with a ROM 12 having stored therein a program for the CPU and a RAM 13 for various data. Connected to the CPU 11 are a display 14, a printer 15, a keyboard 16 and a cash drawer drive assembly 17. The CPU 11 is of course adapted to process usual cash transactions and further executes the cashing process to be described later. Accordingly the display 14, the printer 15, the keyboard 16 and the drive assembly are used also for usual cash transactions. The drive assembly 17 at least has the function of automatically opening the cash drawer in response to an instruction from the CPU 11.

The ECR is further provided with a communication unit 18 for performing communications with the control center to be described later. The communication unit 18 includes a modem, etc. and, when desired, has an automatic dialing circuit. Further when required, the ECR is provided with a card reader 19 and a secret number keyboard 20, which are connected to the CPU 11. The secret number keyboard 20 is preferably provided externally of the ECR separately therefrom and connected thereto by a cord so as to be operable only by the customer, instead of being incorporated in the ECR.

Figure 2:
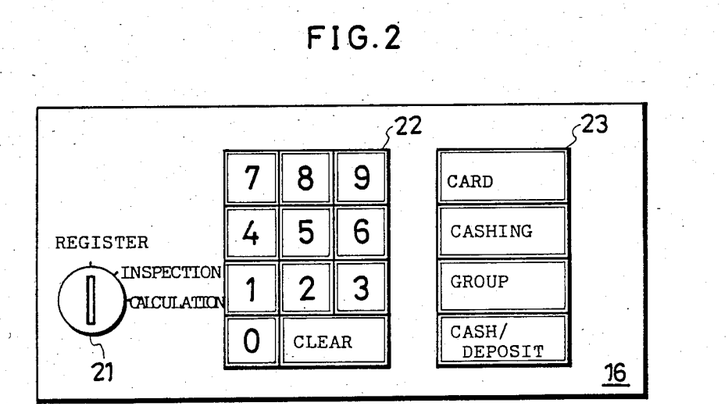
FIG. 2 shows the keyboard on the ECR.

FIG. 2 shows an example of keyboard 16. As is well known, the keyboard 16 has a mode switch 21, numerical keys 22 and function keys 23. The function keys 23 include a "CARD" key and a "CASHING" key.

Cashing cards are used for the present embodiment to verify the authenticity or eligibility of the customer and to preclude dishonest acts. A magnetic stripe affixed to the card has magnetically recorded therein at least a code indicating that it is a cashing card and a card number. When required, a secret number is recorded therein. While the card number is used for identifying the bearer (user) of the card according to the present embodiment, a user (customer) identifying symbol other than the card number is of course usable. The card number is recorded on the cash card also visibly, for example, by embossing.

The cashing card to be used for the present embodiment is issued from the store or an association to which the shop belongs. However, a bank card or cash card issued from a bank or a credit card issued from a credit company is also usable. As is well known, the bank card (cash card) has recorded therein the user's account number and secret number, the bank number identifying the bank where the account is opened, the branch number concerned, etc. The credit card has recorded therein the code of the credit company, the member number, etc.

Figure 3:
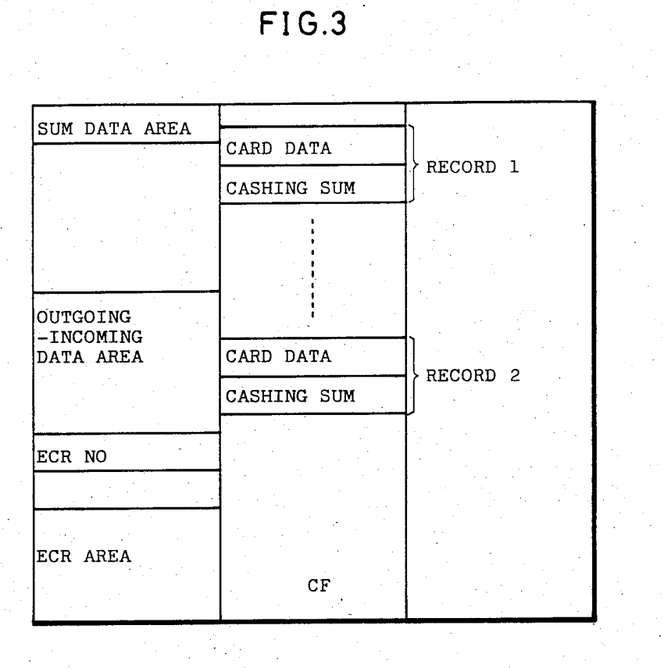
FIG. 3 shows the contents of a RAM in the ECR.

FIG. 3 shows the contents of the RAM 13 in the ECR. The RAM 13 has, in addition to an ECR area for storing various data for cash registration processing, a sum data area, an outgoing-incoming data area, an area for storing the ECR number identifying the ECR, and an area for use as a cashing file (hereinafter referred to as "CF"). Cashing sums are stored on the CF in corresponding relation to the card data (chiefly the card number).

Figure 4:
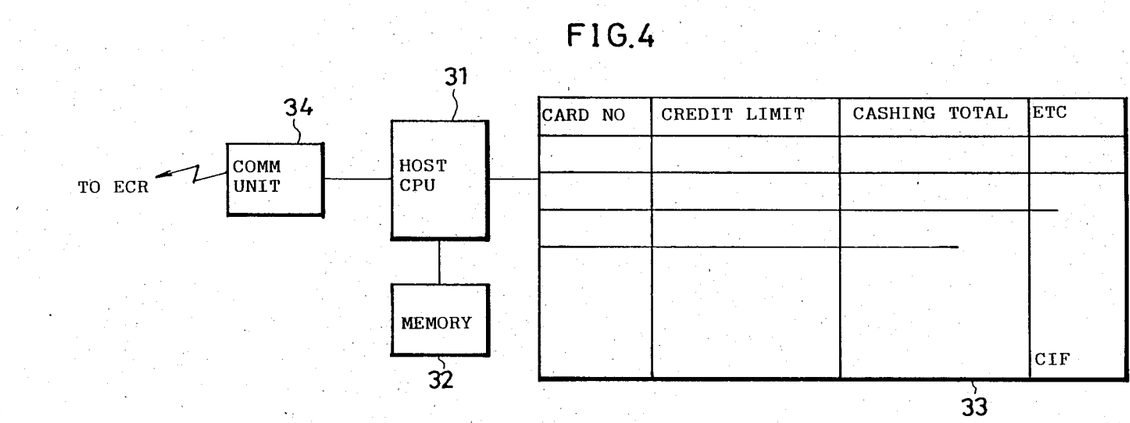
FIG. 4 is a block diagram showing the electric construction of a center.

FIG. 4 shows the construction of the control center for illustrative purposes. The cashing process to be executed by each ECR is controlled by a host CPU 31, which is provided with a memory 32 for storing a program therefor and various items of data, and a communication unit 34 for communicating with the ECR's. The center has a customer information file (CIF) 33 which is accessible by the CPU 31. In the CIF, the credit limit, cashing total and other data are stored in corresponding relation to each card number. The term "credit limit" means the upper limit on the sum of cash that can be offered to the customer. The cashing total is the total of sums cashed for the customer.

The ECR can be adapted to communicate with the center at a bank or at a credit company. The bank center has a CIF on which for each customer having an account at the bank, the deposit balance and, when required, the credit limit and cashing total will be stored in corresponding relation to his account number. On the CIF at the credit company, the credit limit, sum of transactions (cashing total), etc. will be stored in corresponding relation to the member number of each customer which is a member of the credit company.

Figure 5:
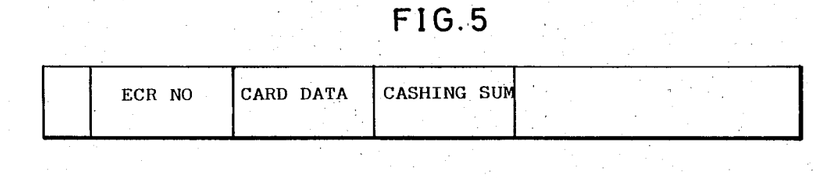
FIG. 5 shows a message from the ECR to the center.

FIG. 5 shows an example of format of the message to be sent from the ECR to the center. At least the ECR number, card data and cashing sum are forwarded from the ECR to the center.

Figure 6:
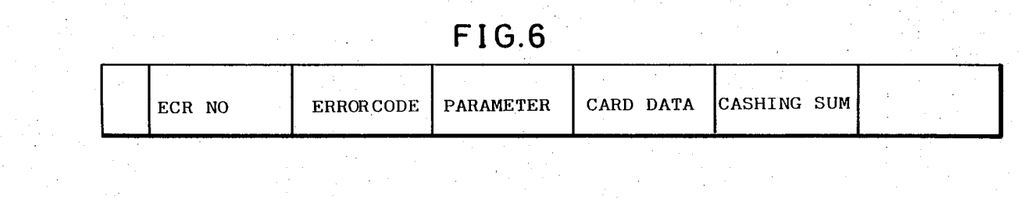
FIG. 6 shows a message from the center to the ECR.

FIG. 6 shows an example of format of the message to be sent from the center to the ECR. The message from the center to the ECR at least contains the ECR number, data as to the acceptability of cashing service determined by the center, i.e. error code and parameter (which will be described in detail leter), and the card data and cashing sum forwarded from the ECR to the center.

Figure 7A:
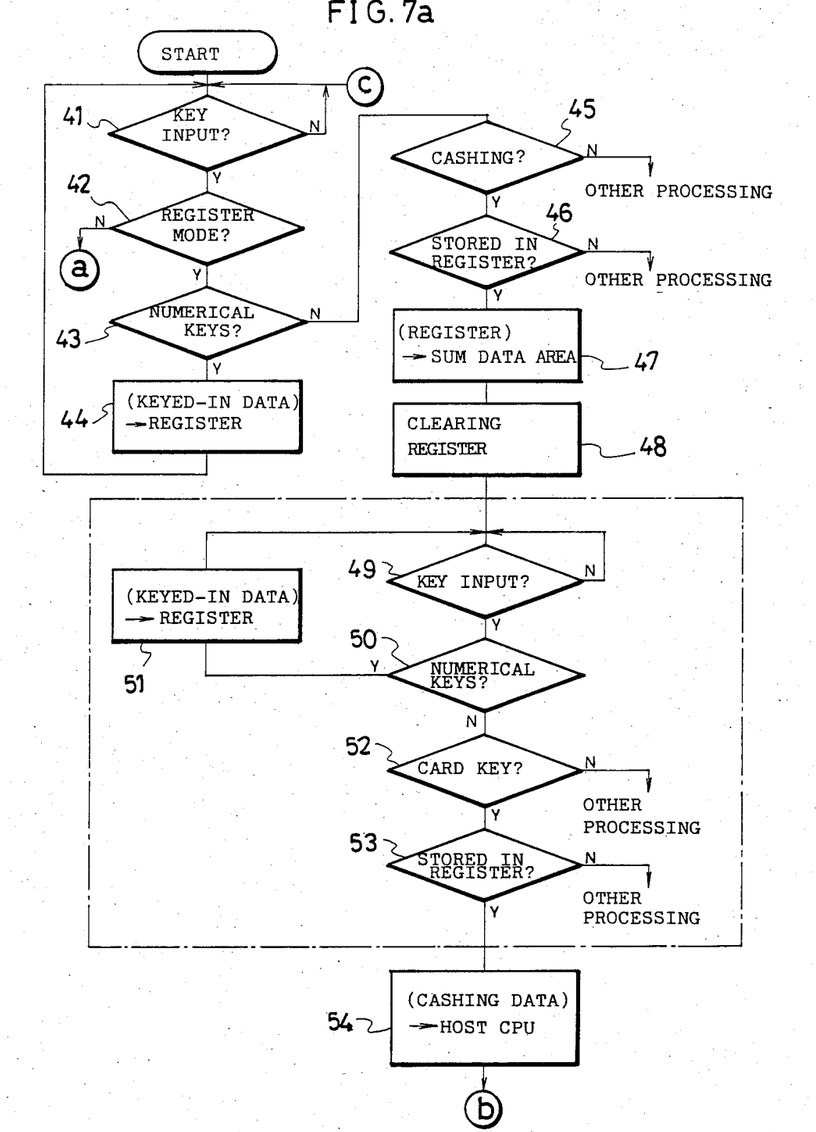
FIGS. 7a and 7b show a flow chart for the operation of the ECR.
Figure 7B:
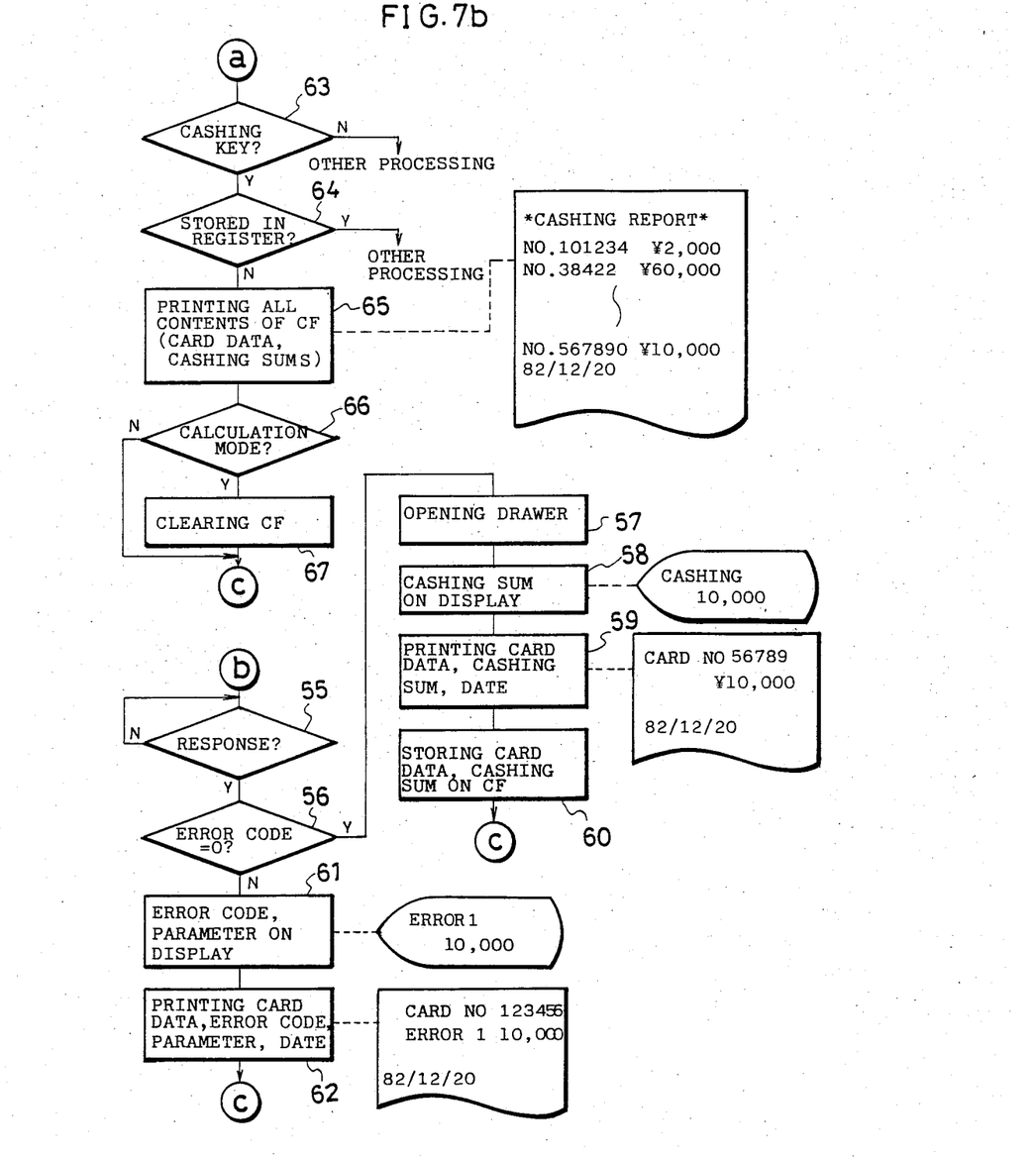

FIGS. 7a and 7b shows a portion of the program for the CPU 11 of the ECR which portion is necessary for the cashing process to be executed. With the mode switch 21 set to the register mode, the operator enters a cashing sum by numerical keys 22 first, then depresses "CASHING" key included in the function keys 23, thereafter enters the card data with numerical keys 22, and subsequently depresses "CARD" key included in the function keys 23.

When the cashing sum is entered by numerical keys 22 in FIG. 7a, the interrogations of steps 41 to 43 are answered in the affirmative, whereupon the keyed-in cashing sum is temporarily stored in a numerical register within the CPU 11 (step 44). When "CASHING" key is depressed next, steps 41 and 42 prove "YES" but step 43 is answered in the negative, so that step 45 follows. Because step 45 is answered in the affirmative, step 46 follows. With the cashing sum already stored in the numerical register, the question of step 46 is answered in the affirmative. The cashing sum is transferred from the numerical register to the sum data area of the RAM 13 (step 47), and the numerical register is cleared (step 48). Thus the cashing sum is completely entered.

Subsequently with reference to the card delivered from its user to the operator, the operator enters the card data (e.g. card number) with numerical keys 22. The operator then depresses "CARD" key. Accordingly the questions of steps 49 and 50 are answered in the affirmative, and the keyed-in card data is temporarily stored in the numerical register (step 51). With "CARD" key depressed, step 52 proves affirmative. With the card data already transferred to the numerical register, step 53 is also answered in the affirmative. The sequence therefore proceeds to step 54, in which the card data in the register, cashing sum in the sum data area, ECR number, etc. are formed in the outgoingincoming data area of the RAM 13 into a message as shown in FIG. 5 and the message is sent to the center. When the ECR is connected to the center by a direct circuit, the center need not be dialed, but if the connection is through a usual telephone line, the communication unit 18 automatically dials the center with reference to the telephone number which is stored in the RAM 13 or the like to send the message to the center through the telephone line.

Figures 8, 9:
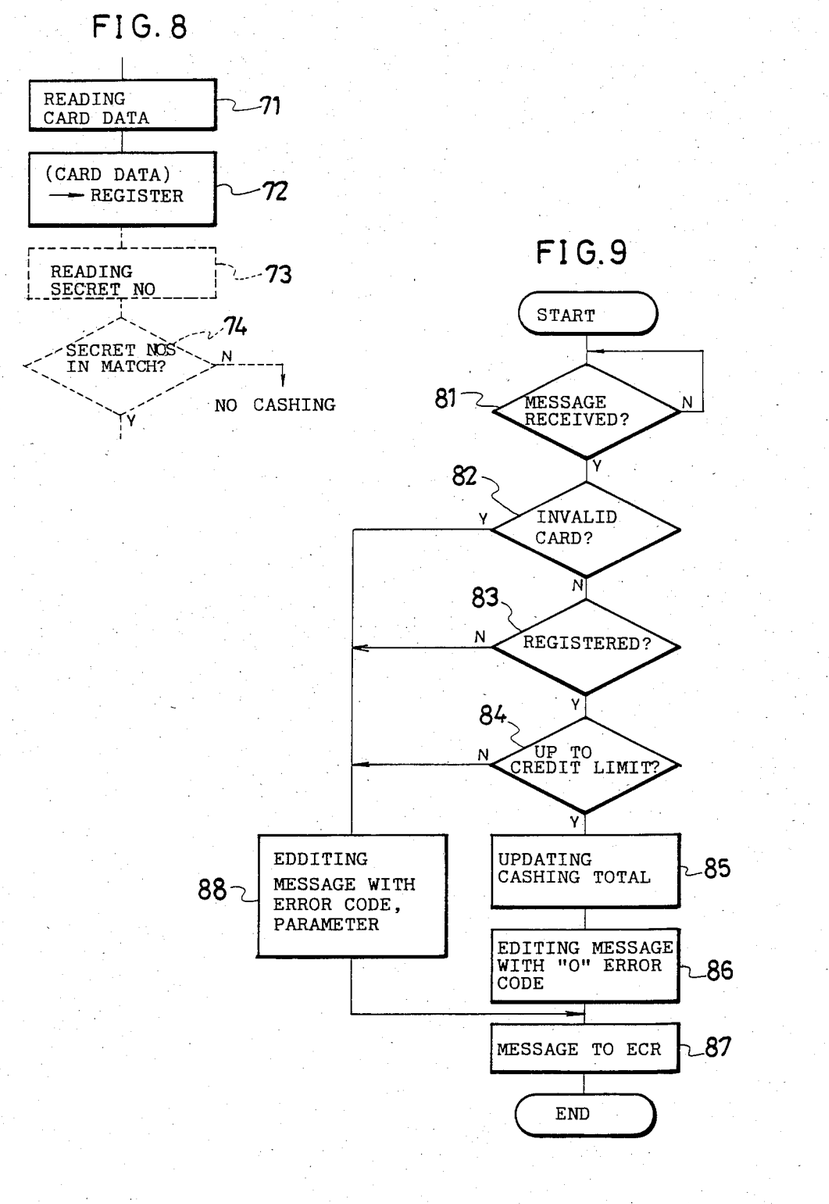
FIG. 8 is a flow chart showing a modification of operation of the ECR.
FIG. 9 is a flow chart showing the operation of the center.

When the ECR is provided with the card reader 19, steps 49 to 53 surrounded by a broken line in FIG. 7a are replaced by the steps shown in FIG. 8. When the cashing card is inserted into the card reader 19 or thereby manually scanned, the card reader 19 reads the card data (step 71), which is stored in the numerical register (step 72).

When the secret number is to be checked by reference, the customer enters with the secret number keyboard 20 his secret number, which is read (step 73) and then checked for a match with the secret number included in the card data read from the card (step 74). If a match is obtained, the ECR proceeds to a communication with the center. If otherwise, no cashing service is provided. The sequence can be such that the customer will be allowed to key in the secret number again.

FIG. 9 shows the process to be executed by the host CPU 31 at the center. Upon receipt of the cashing message from ECR (step 81), the card used is checked as to whether it is invalid (step 82). The center has an invalid card file storing the card numbers of the cards which have be invalidated for one cause or another. Unless the card number contained in the message received from the ECR is on the invalid card file, the CIF 33 is then searched to check whether the the transmitted card number is registered on the file (step 83). If the card number is found registered, the cashing sum transmitted from the ECR is checked as to whether it is up to the credit limit on the corresponding card number on the CIF 33 (step 84). Alternatively, the cashing sum may be compared with the value obtained by subtracting the cashing total from the credit limit on the CIF 33. In either case, when the cashing sum is found not in excess of the credit limit, indicating that the cashing service is allowable, the transmitted cashing sum is added to the cashing total, whereby the cashing total on the CIF 33 is updated (step 85).

The data relating to the acceptability of the cashing service and sent forward from the center to the ECR includes an error code and a parameter as shown in FIG. 6. The error code, which represents whether the cashing service is allowable, is "0" when the service is allowable. When the service is not allowable, the code is a numerical figure other than "0": for example, "1" when the credit limit is exceeded ("NO" for step 84), or "2" when the card number is not registered ("NO" for step 83), or "3" when the card is invalid ("YES" for step 82). The parameter represents more detailed information. For example, no parameter is used when the service is allowable, but the credit limit, if exceeded, is shown as the parameter.

When the cashing sum is updated on the CIF 33 if the service is allowable (step 85), a message as shown in FIG. 6 and containing an error code of "0" is edited (step 86). In the case where the cashing service is not allowable, a message is edited which contains an error code other than "0" according to the reason for the unacceptance and further containing, when required, a pertinent parameter (step 88). The message is sent to the ECR concerned.

With reference to FIG. 7b, the ECR receives the message from the center (step 55), whereupon the ECR checks whether the error code in the message is "0" (step 56). The error code, if "0", indicates that the service is allowable, so that the cash drawer is automatically opened (step 57). The cashing sum is shown on the display 14. The operator can therefore withdraw cash from the drawer and hand it over to the customer. The drawer is of course thereafter closed. The card data, cashing sum and date are printed on a journal and a slip (receipt) by the printer 15 (step 59). The journal serves as a record for the ECR, while the receipt is delivered to the customer. When required, the embossment on the card is imprinted. Finally the card data and cashing sum are stored on the CF within the RAM 13 (step 60).

When the step 56 finds that the error code is not "0", the error code and the parameter from the center are shown on the display 14 (step 61). The display "ERROR 1, 10000" shown in FIG. 7b indicates that the reason for the unacceptability of the transaction is excess of the credit limit which is 10000 yen. The card data, the error code, the parameter and the date are printed on the journal by the printer 15 (step 62). The cashing sum can be re-entered thereafter depending on the cause of unacceptability of the transaction, for example, when the cashing sum is in excess of the credit limit.

The contents of the CF in the RAM 13 can be read out, or the CF can be cleared according to the present embodiment. Such a step is necessary for the management of cashing services. When "CASHING" key is depressed with the mode switch 21 set to the inspection mode, all data on the CF is printed. When "CASHING" key is depressed in the calculation mode, all data on the CF is printed, and the CF is cleared.

With reference to FIGS. 7a and 7b, when "CASHING" key is depressed in a mode other than the register mode ("YES" for step 41, "NO" for step 42, and "YES" for step 63) and if there is no numerical key input (step 64), all data on the CF within the RAM 13 is printed on the journal by the printer 15 (step 65). In the inspection mode, step 66 is answered in the negative, whereupon the process is completed, while in the calculation mode, the CF is entirely cleared of the data (step 67).

Although the CIF is provided at the center with the foregoing embodiment, the CIF may be provided in the ECR. In this case, the communication unit 18 will become unnecessary. Although the above embodiment is so adapted that the cash drawer is automatically opened under the specified conditions, the drawer can alternatively be unlocked then so as to be openable. The specified conditions may be presence of a specific key input without checking of the credit limit.

The present invention is applicable to ECR's which are connected to the center of a bank or of a credit company. In this case, the term "cashing" means withdrawal of cash from the deposit account or lending of cash (loan). The cashing total will then be recorded on the CIF at the center of the bank or credit company, or the cashing sum only will be subtracted from the customer's deposit balance, or the cashing sum may be stored as a sum of transaction, loan or the like. It will be preferred that the ECR have the telephone numbers of a plurality of centers stored in its RAM and have an automatic dial circuit in its communication unit so as to communicate with the centers.

The ECR or some other automatic transaction performing apparatus will be usable for the payment of the cashing total, replenishment of the deposit or payment of transactions. For making payments in this case, a predetermined indulgence period may preferably be provided.

What is claimed is:

1. A cashing system comprising a control center and an electronic cash register connected to the control center by a communication channel, the control center comprising:
    means for receiving data from and transmitting data to said electronic cash register;
    a customer file for storing cash dispensing data in corresponding relation to individual customer identifying data; and
    means for receiving a cash dispensing operation request from said electronic cash register, a cash dispensing operation being one where a customer receives cash from said cash register with the amount thereof being chargeable to a customer's account, means for determining whether or not a cash dispensing operation should be permitted, and means for transmitting a cashing permission instruction to said cash register if a cash dispensing operation is permitted, the electronic cash register comprising:
    a cash drawer;
    means for performing and recording a sales transaction;
    a keyboard for performing and recording a sales transaction;
    a keyboard having a cashing key for selecting a cash dispensing operation in which cash is dispensable from said drawer to said customer with the amount thereof being chargeable to the customer's account, and numerical keys for entering a cash dispensing sum involved in the cash dispensing operation;

input means for entering customer identifying data;

means for transmitting data concerning a request for a cash dispensing operation, including customer data and a cash dispensing sum, to said control center; and drawer control means for making said drawer operable in response to a cashing permission instruction received from said control center.

2. A cashing system as in claim 1, further comprising means at said electronic cash register for receiving an identity code from a customer which is related to said customer identifying data, and means for permitting a cash dispensing operation to proceed when a predetermined relationship exists between said identity code and said customer identifying data.

3. An electronic cash register comprising:

a keyboard for entering data relating to a sales transaction operation and for entering data relating to a cash dispensing operation in which a customer receives cash with the amount thereof being chargeable to a customer's account, the keyboard having a cashing key for selecting the cash dispensing operation and numerical keys for entering a cash dispensing sum involved in said cash dispensing operation;

a cash drawer for accommodating cash received from customers and to be delivered to customers;

means for allowing the cash drawer to be openable;

input means for entering customer identifying data;

a registration file for storing data relating to a sales transaction operation;

a cashing file for storing a cash dispensing sum associated with a cash dispensing operation in corresponding relation to customer identifying data; and a control unit having a sales transaction operation control means for storing data relating to the sales transaction operation in said registration file based on data entered from said keyboard, and cash dispensing operation control means for storing a cash dispensing sum associated with a cash dispensing operation entered from said numerical keys and corresponding customer identifying data fed by said input means in said cashing file and for causing said cash drawer to be openable by said allowing means under specified conditions, when a cash dispensing operation is selected by said cashing key.

4. An electronic cash register as defined in claim 3, wherein the customer identifying data is contained on a card, and said input means is said keyboard.

5. An electronic cash register as defined in claim 3, wherein the customer identifying data is contained on a card, and said input means is a card reader.

6. An electronic cash register as defined in claim 3, further comprising a communication unit for communicating with a control center having a customer file, said control center determining whether said specified conditions are satisfied.

7. An electronic cash register as defined in claim 6, further comprising means for recognizing a cashing permission message received from said control center, said allowing means causing said cash drawer to be openable when said cashing permission message from said control center is recognized.

8. An electronic cash register as defined in claim 6, further comprising a display device for displaying the result of said determination by said control center.

9. An electronic cash register as defined in claim 3, further comprising a printer for printing data pertaining to a cash dispensing operation, including a cash dispensing sum and customer identifying data.

10. An electronic cash register as in claim 3, further comprising means for receiving an identity code from a customer which is related to said customer identifying data, and means for permitting a cash dispensing operation to proceed when a predetermined relationship exists between said identity code and said customer identifying data.

* * * * *